Jan. 20, 1931. A. L. GILLIAM 1,789,403
CUTTER GUARD FOR AGRICULTURAL IMPLEMENTS
Filed Dec. 14, 1929 2 Sheets-Sheet 1
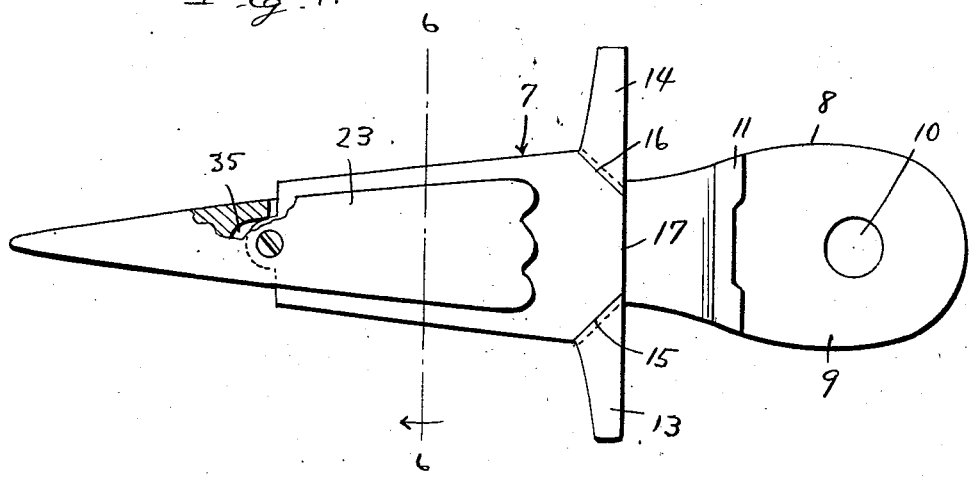
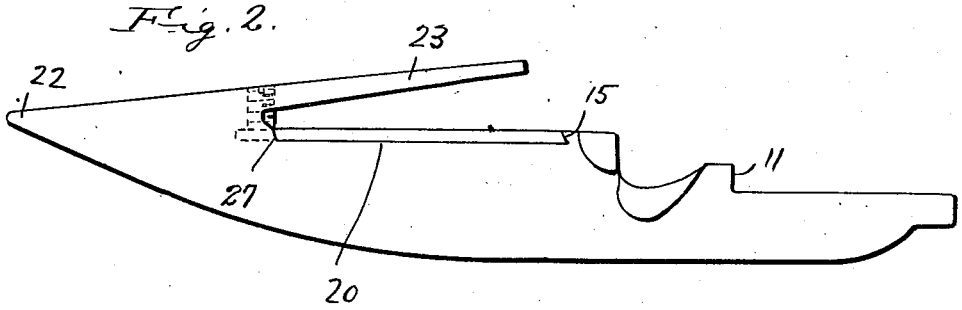
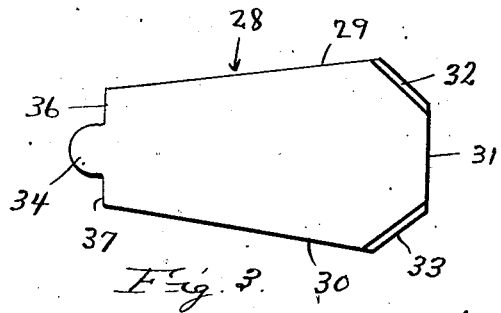
Inventor
A. L. Gilliam
By Clarence A. O'Brien
Attorney

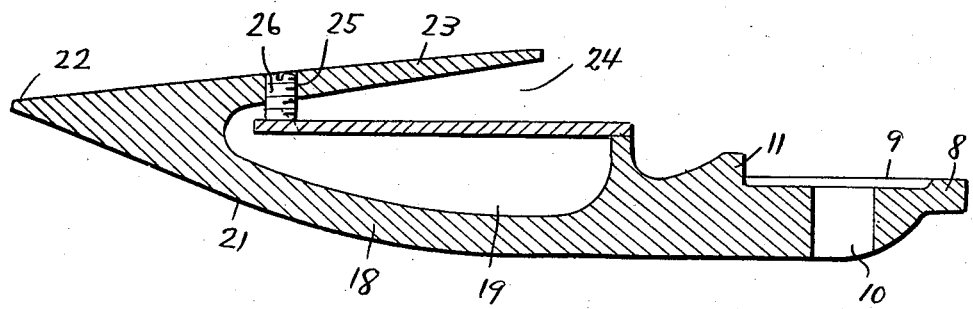
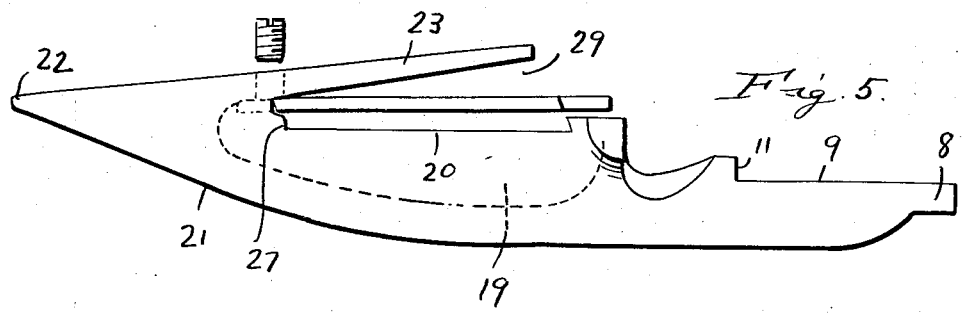

Patented Jan. 20, 1931

1,789,403

UNITED STATES PATENT OFFICE

AUGUSTAN L. GILLIAM, OF GILLIAM, MISSOURI

CUTTER GUARD FOR AGRICULTURAL IMPLEMENTS

Application filed December 14, 1929. Serial No. 414,114.

This invention relates to cutter guards for agricultural implements including mowing machines, reapers and binders.

An object of the invention is to provide an improved ledger plate construction that prevents movement of the ledger plate and furthermore provide for quick and easy detachment for replacing worn ledger plates.

Further objects of the invention are to provide a device of the character referred to which is strong, compact and durable, thoroughly reliable for its intended purpose, very simple in its method of assembly, which requires very little change from standard construction of knife guards, and which is inexpensive to manufacture and apply.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claim hereunto appended.

In the drawings wherein like reference characters denote corresponding parts throughout the several views:

Figure 1 is a top plan view, partly broken away, of a knife guard with the present invention applied thereto, Figure 2 is a side elevation thereof, Figure 3 is a top plan view of the ledger plate removed from the guard, Figure 4 is a central longitudinal, vertical section thereof, Figure 5 is a side elevation of the guard illustrating the assembling of the ledgerplate therewith, Figure 6 is a vertical section taken substantially on the line 6—6 of Figure 1, and looking in the direction of the arrows.

Referring to the drawings in detail 7 indicates generally the body portion of the guard projecting from the rear of which is in attaching arm or extension 8 which has a flat upper face 9 at its rear end. There is an opening 10 extending through the extension 8 at approximately the center of the flat upper face 9 by which the guard is attached to the agricultural implement.

An upstanding shoulder 11 is formed at the inner end of the upper face 9 and forms a shoulder or abutment when the guard is attached to the machine. Where the extension 8 merges with the body portion 7 there are formed a pair of laterally projecting wings 13, 14 on the opposite sides of the body portion.

Each of the wings 13, 14, terminates in diagonal inwardly beveled shoulders 15, 16 respectively. The bevel on these shoulders is clearly shown in Figures 2 and 5 of the drawings.

Between the inner ends of the diagonal shoulders 15, 16 there is a straight space 17. The body portion 7 further includes a base 18 cupped at its center as at 19. The walls of the base 18 on the sides of the cupped portion are below the level of the upper sides of the wings 13, 14 as is indicated at 20.

The base portion 18 of the body portion 7 is curved as at 21 and merges into a point 22 from which projects an upwardly inclining plate 23 which is formed integral with the base. The plate 23 being spaced from the base 18 provides a pocket between the upper edge 20 and the plate.

Through the center of the plate adjacent the point of juncture with the base 18, there is formed a peripherally threaded opening 25 that receives a set screw 26. The length of the set screw 26 is such that when it is screwed flush with the upper surface of the plate 23 it will project into the pocket 19.

At the outer end of the top edges of the sides 20 there are formed upstanding shoulders 27 which are spaced below the plate 23 and disposed rearwardly of the forward end of said plate 23. The ledger plate is indicated generally at 28 and has diagonal sides 29 and 30 and is flat on both top and bottom surfaces.

On the inner end of the plate is a straight edge 31. At its ends the straight edge 31 merges with diagonal beveled edges 32, 33 which are engageable with the beveled shoulders 15, 16. The plate 28 on its forward edge is formed with an integral tongue 34.

The thickness of the plate 28 should be the thickness of the upstanding shoulders 15, 16. In assembling the plate in the guard of the present invention, the tongue 34 extends into an arcuate pocket 35 formed in the forward portion of the cup shaped portion 19.

The forward straight edges 36, 37 will abut the shoulders 27 and the beveled portions 32, 33 will engage the diagonal shoulders 15, 16. The intermediate straight edge 31 fits in the space 17 between the diagonal shoulders 15, 16. Of course the screw 26 will have to be removed or retracted to prevent interference with the tongue 34 while the plate 28 is being assembled in the guard.

From an inspection of Figure 5 of the drawings it will be seen that there is ample space provided above the shoulder 17 so that the plate may be manipulated to engage the diagonal sides 32, 33 with the shoulders 15, 16.

After the diagonal sides are engaged with the shoulders, slight pressure will cause the straight edges 36, 37 to engage with the shoulders 27, the side edges 29, 30 resting upon the upper side edges 20. When the plate 28 is thus assembled, the set screw 26 is screwed downwardly whereby the plate is locked in operating position.

It is to be understood that by describing in detail herein, any particular form, material, arrangement, it is not intended to limit the invention, beyond the terms of the claim, or requirements, of the prior art.

Having thus described my invention, what I claim as new is:

A cutter guard of the character described comprising a body portion, means for securing the body portion on a support, an integral plate extending upwardly and rearwardly from an intermediate portion of the body portion, said plate having a threaded opening extending therethrough adjacent its point of mergence with the body portion, aligned, transversely spaced, upstanding shoulders formed integrally on the body portion in spaced relation beneath the plate and rearwardly of the forward end of the plate, diagonally disposed beveled shoulders spaced rearwardly of the first named shoulders and formed integrally with the body portion, a plate having beveled, diagonal edge portions engageable with the beveled shoulders in a manner to retain one end of the plate on the body portion, an integral tongue on the other end of the plate for disposition between the first named shoulders, a set screw threaded in the opening for engagement with the tongue for securing said other end of the plate on the body portion, the marginal edges of the plate adjacent opposite sides of the tongue being engageable with the first named shoulders in a manner to positively retain the plate against forward longitudinal movement relative to the body portion.

In testimony whereof I affix my signature.

AUGUSTAN L. GILLIAM.